(12) United States Patent
Collin et al.

(10) Patent No.: US 6,351,846 B1
(45) Date of Patent: Feb. 26, 2002

(54) INFORMATION SERVER FOR KERNEL AND PASSIVE MODE SYSTEMS

(75) Inventors: Zeev Collin, Herzliya; Tal Tamir, Tel Aviv, both of (IL)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/250,458

(22) Filed: Feb. 16, 1999

(51) Int. Cl.[7] .................................................. G06F 9/44
(52) U.S. Cl. ........................................... 717/4; 709/318
(58) Field of Search ................................. 709/310–332, 709/200–253; 707/104; 345/440; 713/1, 2, 100; 717/4

(56) References Cited

U.S. PATENT DOCUMENTS

| | | | |
|---|---|---|---|
| 5,615,323 A | 3/1997 | Engel et al. | 345/440 |
| 5,684,988 A | 11/1997 | Pitchaikani et al. | 707/104 |

OTHER PUBLICATIONS

Caswell et al., "Implementing a Mach Debugger for Multi-threaded applications," USENIX Technical Conference and Exhibition, Washington, D.C., Jan. 1990, pp(13).*

(no author given), "Kernel Debugging," Digital Equipment Coporation, Maynard, Massachusetts, Aug. 1994, Chapters 1–6.*

* cited by examiner

*Primary Examiner*—St. John Courtenay, III
(74) *Attorney, Agent, or Firm*—Akin, Gump, Strauss, Hauer & Feld, LLP

(57) ABSTRACT

A system and a method for building an online database for a computer system having a server module configured to receive information from client modules. The method comprises configuring at least one client module to communicate with the server module when the at least one client module is operating on the computer system. At least one communication channel is established between the at least one client module and the server module such that information may be passed from the at least one client module to the server module. This information is passed through the at least one communication channel from the at least one client module to the server module and compiled, with the server module, in a manner selected by a user of the computer system. The information is displayed in the manner selected by the user of the computer system to thereby assist in diagnostics of the computer system.

15 Claims, 6 Drawing Sheets

Application Mode
- - - - - - - - - - - - - - - - - - - - - - - - - - - -
Kernel Mode though no passive mode program exists on the system, the at least one passive mode program could further comprise a module that enables the at least one passive mode program to operate transparently to the information server if at least one communication channel is not established between the at least one passive mode program and the server application.

INFORMATION SERVER FOR KERNEL AND PASSIVE MODE SYSTEMS

BACKGROUND

1. Field of the Invention

The present invention relates to an information system for compiling information relating to computer programs, in particular the information system according to the present invention compiles information from both kernel and passive mode systems.

2. Description of the Related Art

Kernel debuggers have been used by kernel developers to print simple text messages during development stages of a kernel. These messages are useful to developers because information otherwise unattainable is made available to the developers and can be used to correct errors and make improvements in the kernel as it is being developed. However, any debugging code that is added to the kernel during development stages is typically removed when development of the kernel is completed. Thus, many messages and signals from the kernel of systems that are released to the public are typically difficult if not impossible to monitor after their release to the public. This is also true of many other kernel level applications as well as in many passive level applications.

Visibility for kernel mode systems has always been a problem even for simple hardware drivers and especially for large real time systems like software modems. In large systems, understanding the information produced by a debugger poses a significant problem because the information produced by the debugger is not organized in a manner that allows a human to readily perceive kernel coding problems upon viewing the information. Further, all the desired information from the kernel is not made readily available to the user. The traditional way of using kernel debuggers to identify and solve problems is at best suitable for small-scale systems. In addition, kernel debuggers cannot be used to monitor system configuration problems and cannot be used to track system problems at remote sites.

Passive mode systems, as opposed to kernel mode systems, also have debuggers available for system development. However, these debuggers suffer from many of the same drawbacks as kernel debuggers.

SUMMARY OF THE INVENTION

The present invention includes both a system and a method for building an online database for a computer system having a server module configured to receive information from client modules. The method comprises configuring at least one client module to communicate with the server module when the at least one client module is operating on the computer system. At least one communication channel is established between the at least one client module and the server module such that information may be passed from the at least one client module to the server module. This information is passed through the at least one communication channel from the at least one client module to the server module and compiled, with the server module, in a manner selected by a user of the computer system. The information is displayed in the manner selected by the user of the computer system to thereby assist in diagnostics of the computer system.

The information passed from the at least one client module sometimes includes passing information from at least one kernel level module to the server module. In addition, the information passed from the at least one client module could comprise passing information from at least one passive level module to the server module. In the system, any combination of information being passed from the kernel level or the passive level to the server module is contemplated. The information passed from the at least one kernel level module could include information regarding messages, events, and signals. Likewise, the information passed from the at least one passive level module could include information regarding messages, events, and signals. In one embodiment, the information passed from the at least one kernel level module comprises passing information from a kernel of a modem system.

The information received by the server module from the at least one client module may be displayed in a hierarchical structure such that a user can select a particular portion of the information to view in detail. Further, the display of the information can be used to assist a user in performing diagnostics such as modifying a configuration of a modem system to optimize communications between the computer system and another computer system.

In another embodiment according to the principles of the present invention, an information server for kernel and passive mode systems includes at least one server driver that acquires information directly from a kernel of a kernel mode computer program while the kernel mode computer program operates. In addition, a server application is present that is passed information from the at least one server driver in a manner that allows a user to view and organize the information with the server application. The server application is also configured to receive information directly from at least one passive mode program, also in a manner that the user can view and organize the information from the at least one passive mode program.

The information server may pass the information to the server application from the at least one server driver to enable the server application to build a messages and events database. Further, the information passed to the server application from the at least one passive mode program enables the server application to display signals generated by the at least one passive mode program.

In addition, the server application of the information server further comprises at least one communication channel that enables the server application to receive information from at least one server driver and an indicator that indicates to the at least one server driver that the server application is configured to receive information from the at least one server driver through the at least one communication channel. If no indication is received from the server application, the at least one server driver operates as though no server application exists on the system and the efficiency of the system is not affected by the at least one server driver.

To enable this operation, the at least one server driver may further comprise a module that enables the at least one server driver to operate transparently to the information server if at least one communication channel is not established between the at least one server driver and the server application.

Likewise, the server application of the information server further comprises at least one communication channel that enables the server application to receive information from the at least one passive mode program and an indicator that indicates to the at least one passive mode program that the server application is configured to receive information from the at least one passive mode program through the at least one communication channel.

Like the at least one server driver, if no indication is received from the server application that it is configured to receive information, the at least one passive mode program operates as though no server application exists on the system and the efficiency of the system is not affected by the at least one passive mode program.

To enable this operation, the at least one passive mode program may further comprise a module that enables the at least one passive mode program to operate as though no server application exists if at least one communication channel is not established between the server application and the at least one passive mode program. Thus, a computer system operating with the information server operates as though no information server exists on the computer system when the server application is not in operation on the computer system.

BRIEF DESCRIPTION OF THE DRAWINGS

A better understanding of the present invention can be obtained when the following detailed description of the preferred embodiment is considered in conjunction with the following drawings.

DETAILED DESCRIPTION OF THE DRAWINGS

Figure 1:
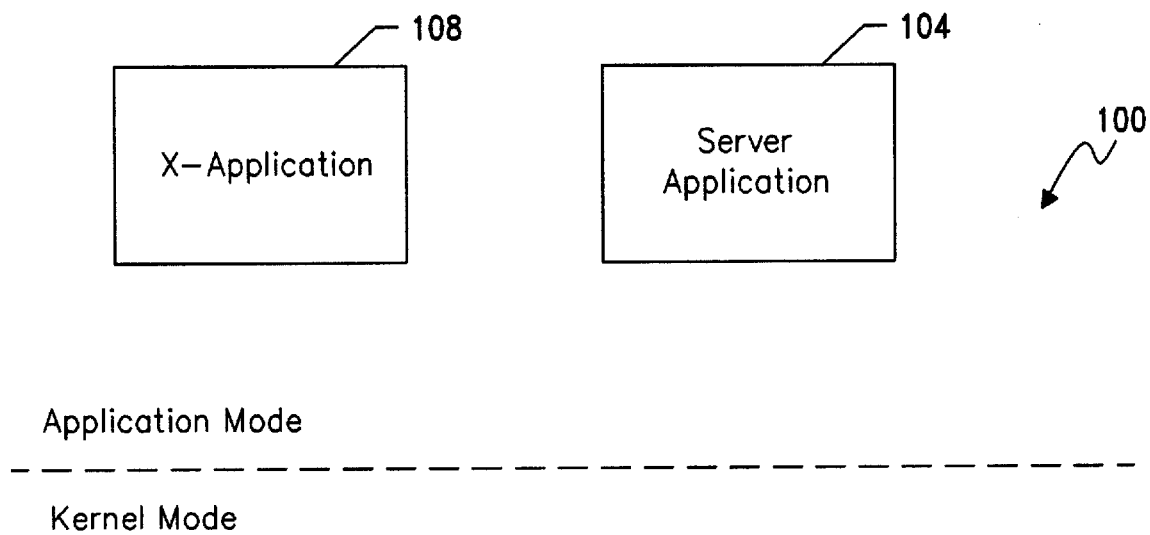
FIG. 1 is a block diagram of an exemplary computer system having modules designed according to principles of the present invention such that information useful for configuration of the computer system can be extracted for user analysis.
Figure 1:
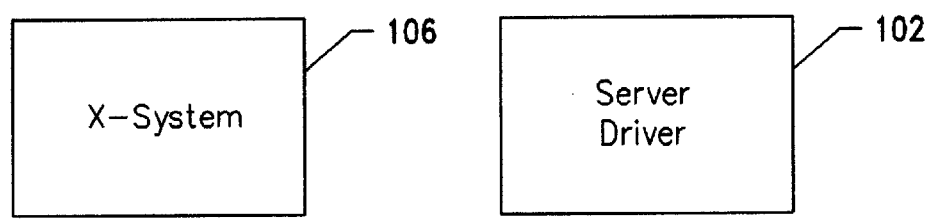

FIG. 1 is a block diagram of an exemplary computer system 100 having modules designed according to principles of the present invention such that information useful for configuration of the computer system 100 can be extracted for user analysis. In one embodiment, the computer system 100 includes a server driver 102 and a server application 104. The server driver 102 is separated from the server application 104 just as any kernel level application is separate from any passive level application. The computer system 100 can be used to build online databases of messages, events, signals, and the like, by passing information to the server application 104 (i) from an X-system 106 at the kernel mode level, (ii) from an X-application 108 at the passive (or application) mode level, (iii) from both, or (vi) from another system.

When the server application 104 is used to create an online database from the information supplied to it, the online database serves many potential purposes. For example, a user may view the information in the database either locally on the computer system 100 itself or remotely on another computer system after the database has been transported, via diskette, email, etc., to the remote system. Viewing the database allows the user to determine if the computer system 100 is properly configured for the X-application 108 and/or the X-system 106. Upon examination of the information contained in the database, the user can determine if the computer system 100 should remain in its current configuration, or if modifications to the configuration should be made to optimize performance of the programs on the computer system 100.

In one embodiment, the X-system 106 and/or the X-application 108 are designed with code similar to the code sample found in Appendix A. For purposes of this disclosure, the code of Appendix A is referred to as client code because it is used to communicate with either the server driver 102 of the kernel mode layer or the server application 104 of the application mode layer. The client code is designed to interact with code from the server driver 102 and/or the server application 104. This interaction allows the server application 104 to compile an online database of messages, events, signals, or other information from the X-application 108 and/or the X-system 106. It should be noted that during operation the X-system 106 and the X-application 108 search for the appropriate server and, if found, create a channel of communication with it to pass messages, events, signals, and the like. Advantageously, if the server is not found, the client does not consume resources from the computer system 100 and does not harm performance of the computer system 100 in any way.

Figure 2:
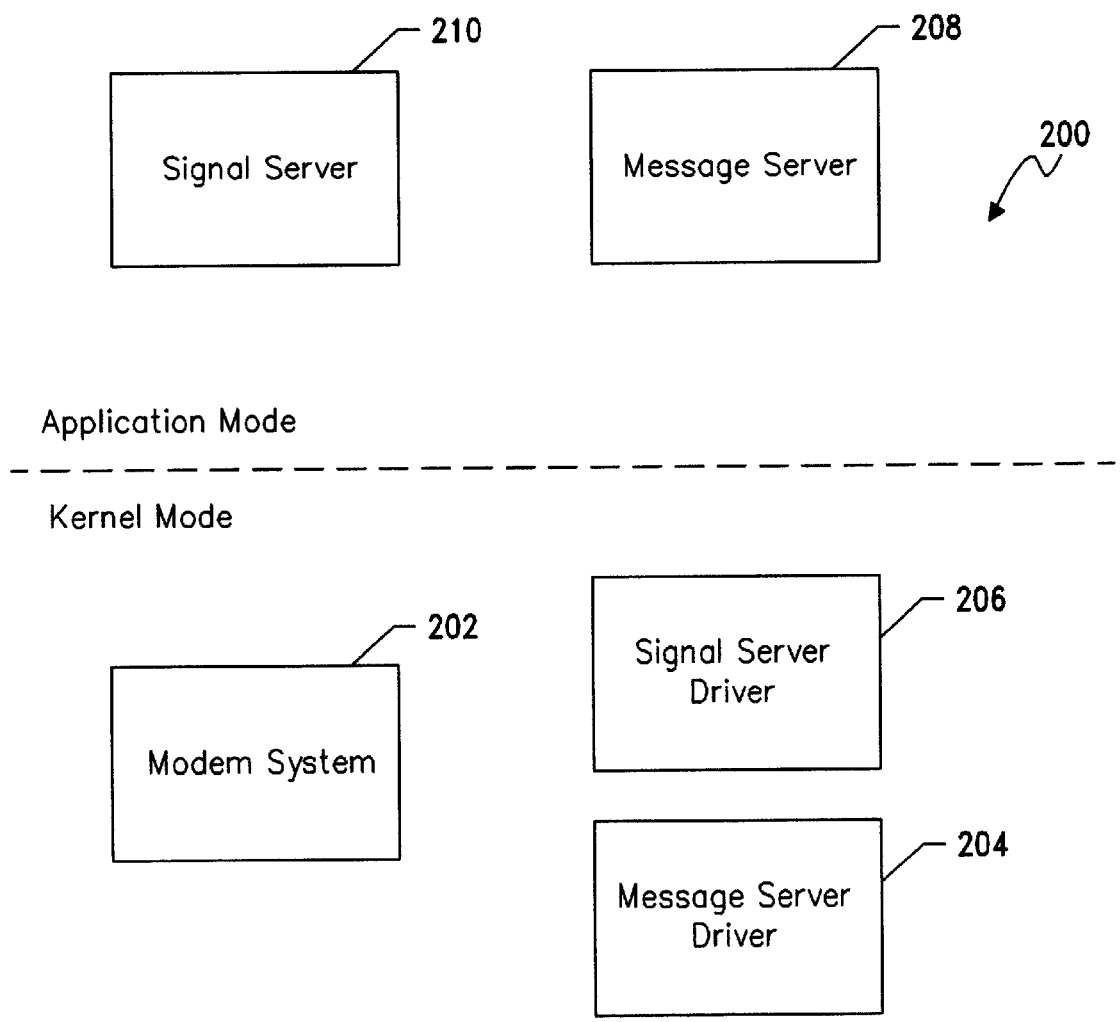
FIG. 2 is a block diagram of an exemplary computer system wherein a modem system, a message server driver, and a signal server driver are illustrated at a kernel mode level of the computer system for interaction with message and signal servers at an application mode level.

FIG. 2 is a block diagram of an exemplary computer system 200 wherein a modem system 202, a message server driver 204, and a signal server driver 206 are illustrated at a kernel mode level of the computer system 200 for interaction with message and signal servers 208, 210 at an application mode level. In a similar manner to the computer system 100, the drivers 204, 206 and servers 208, 210 are used to build an online database of messages, events, signals, or other information from the modem system 202. The message server 208 and the signal server 210 have similar architectures and, in one embodiment, the only difference between the architectures is that the message server 208 is used to build a messages and events database while the signal server 210 is used to dump specific signals generated by the computer system 200.

The computer system 200 is especially useful for solving modem connection problems at a customer site without installing debuggers and sending engineers to debug the problem on site. Modem support personnel may simply ask a user at the site to run the servers 208 and/or 210 in the background and to send the database(s) that is generated to the developers. In this manner, the developers can reproduce the problem at their own site without traveling to the user's site, solve the problem, and then give the user instructions concerning how to correct any configuration problems at the user's site. Of course, this is only an exemplary use of the computer system 100 and other implementations are contemplated. Typically, initial communications are through system calls and then direct function calls are used for additional communications. No other generic solution for both kernel and passive levels is known.

Figure 3:
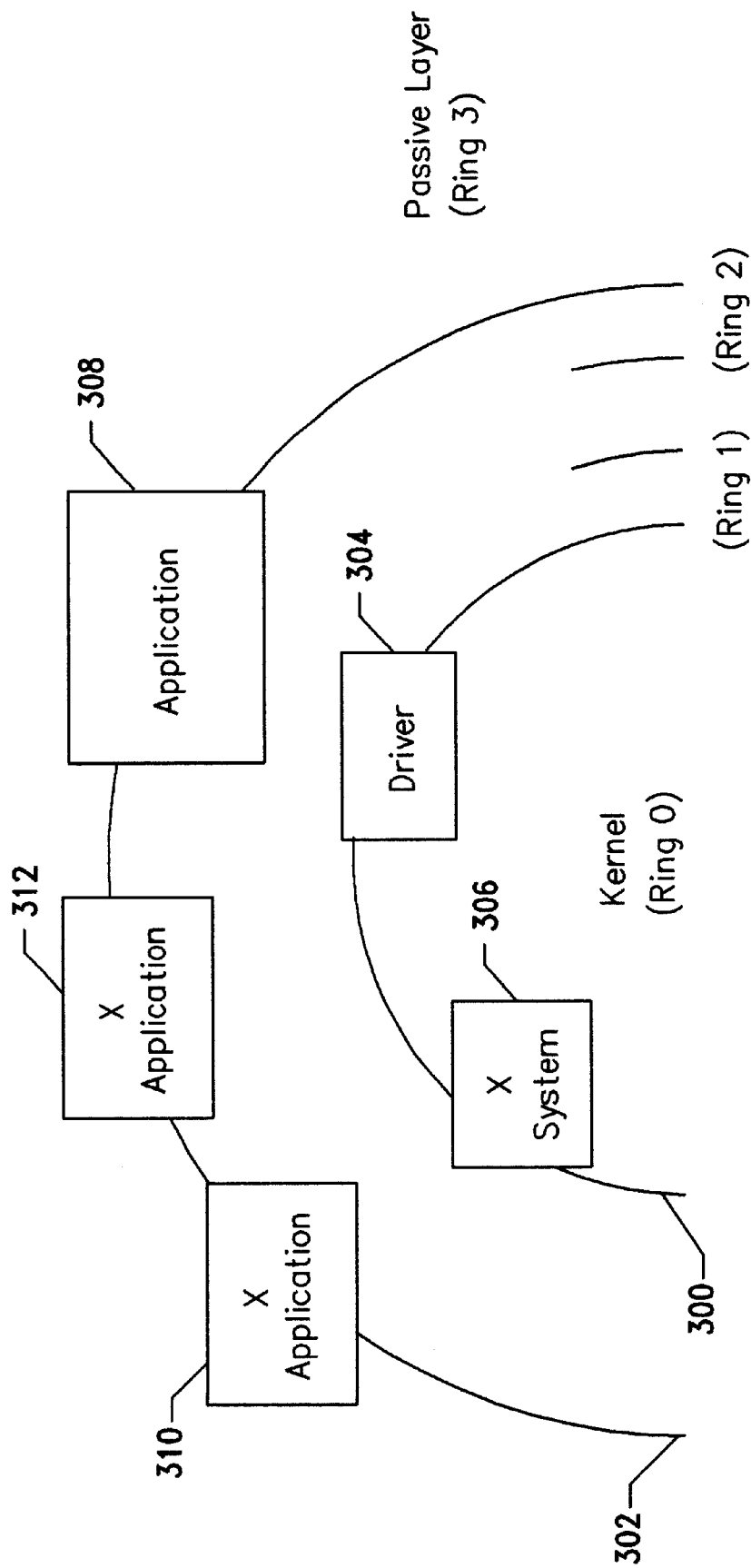
FIG. 3 is a block diagram of kernel mode layer (ring 0) systems interacting with passive mode layer (ring 3) systems in a manner to accomplish configuration and/or diagnostics of a computer system.

FIG. 3 is a block diagram of kernel mode layer (ring 0) 300 systems interacting with passive mode layer (ring 3) 302 systems in a manner to accomplish configuration and/or diagnostics of a computer system. To assist in understanding the principles of the present invention, FIG. 3 illustrates software modules with respect to "rings". Ring 0 systems are systems operating at a kernel mode level while ring 3 systems are systems operating at a passive mode level. In other words, ring 3 systems are application layer systems that sometimes interface with the kernel mode (ring 0) systems. The other two rings, ring 1 and ring 2, represent other layers of the computer system and are illustrated in part only to demonstrate their existence in the computer system.

In one embodiment, driver 304 communicates at the ring 0 level (kernel mode layer 300) with X-system 306. Information may pass from the driver 304 to application 308 at the ring 3 level (passive layer mode 302) through at least two paths. One path is from the driver 304 to the X-system 306, then to an X-application 310 prior to being passed to the application 308. Another path is directly from the driver 304 to the application 308. Of course, these communications are enabled through embedding code such as the sample of Appendix A into the software. Additional paths or variations are contemplated such as direct communication from an X-application 312 to the application 308. Regardless of the communication path, the application 308 enables compilation of information pertaining to computer systems and organization of the information in various formats.

Figure 4:
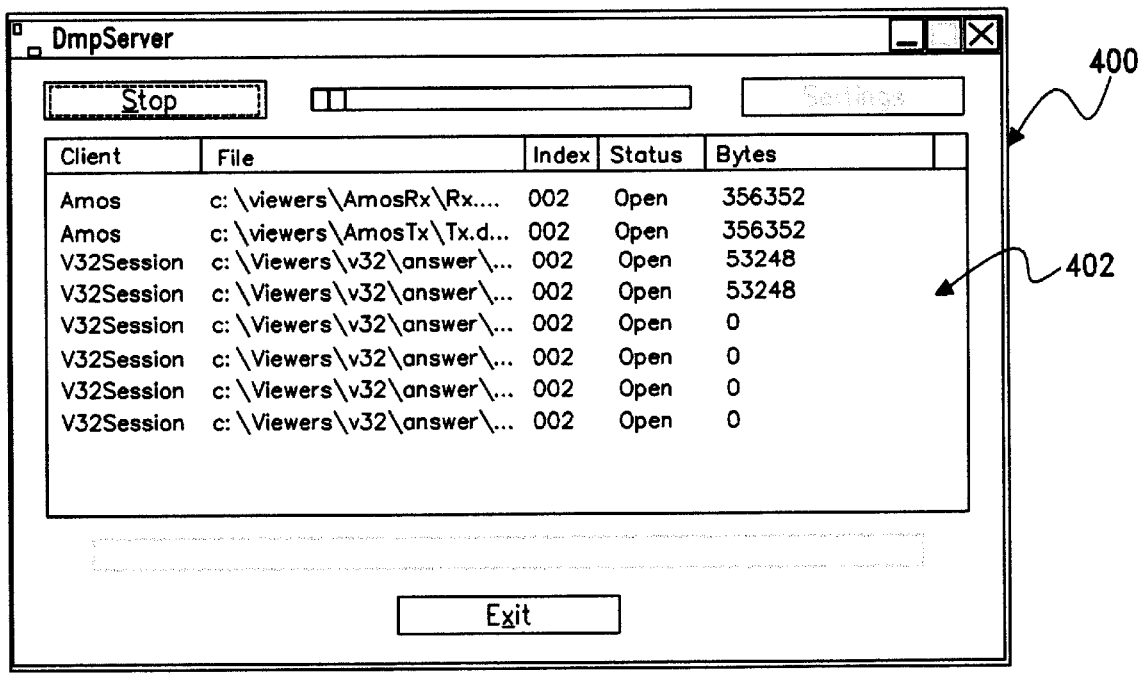
FIG. 4 is a screen shot of exemplary output messages from an exemplary message server application wherein the output messages from the message server are illustrated as being configured according to principles of the present invention.

FIG. 4 is a screen shot 400 of exemplary output messages 402 from an exemplary message server application wherein the output messages 402 from the message server are illustrated as being configured according to principles of the present invention. A user viewing the output messages 402 is enabled to diagnose system configuration problems that relate to the output messages 402. In addition, the output messages 402 can be arranged such that specific information is more readily attainable than if the information was not so arranged.

Figure 5:
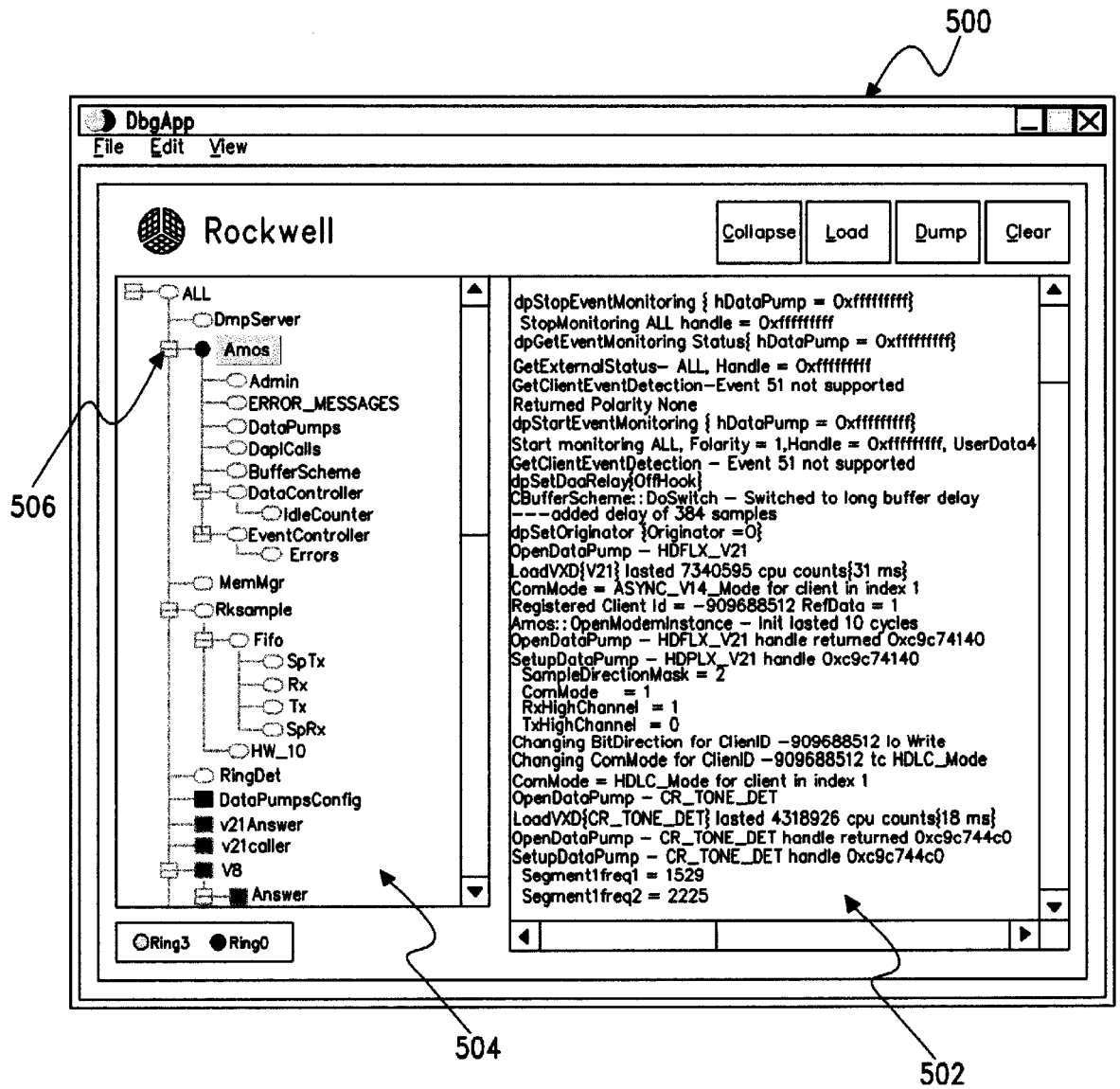
FIG. 5 is a screen shot of exemplary signals from an exemplary signal server application wherein the signals from the signal server are organized into a hierarchical structure to assist a user in locating particular portions of the signals.

FIG. 5 is a screen shot 500 of exemplary signals 502 from an exemplary signal server application wherein the signals 502 from the signal server are organized into a hierarchical structure to assist a user in locating particular portions of the signals 502. The hierarchical structure is illustrated at 504 of the screen shot 500 where it is apparent that particular portions of the signals 502 can be selected by selecting (through a standard mouse operation or the like) a particular portion of the hierarchical structure. In this case, the particular portion of the signals 502 that has been selected for viewing is an advanced modem operating scheduler (AMOS) 506. By selecting the AMOS 506, the signals 502 corresponding to signals from the AMOS 506 are displayed for viewing by a user. Thus, the user is able to quickly diagnose configuration problems in the system.

Figure 6:
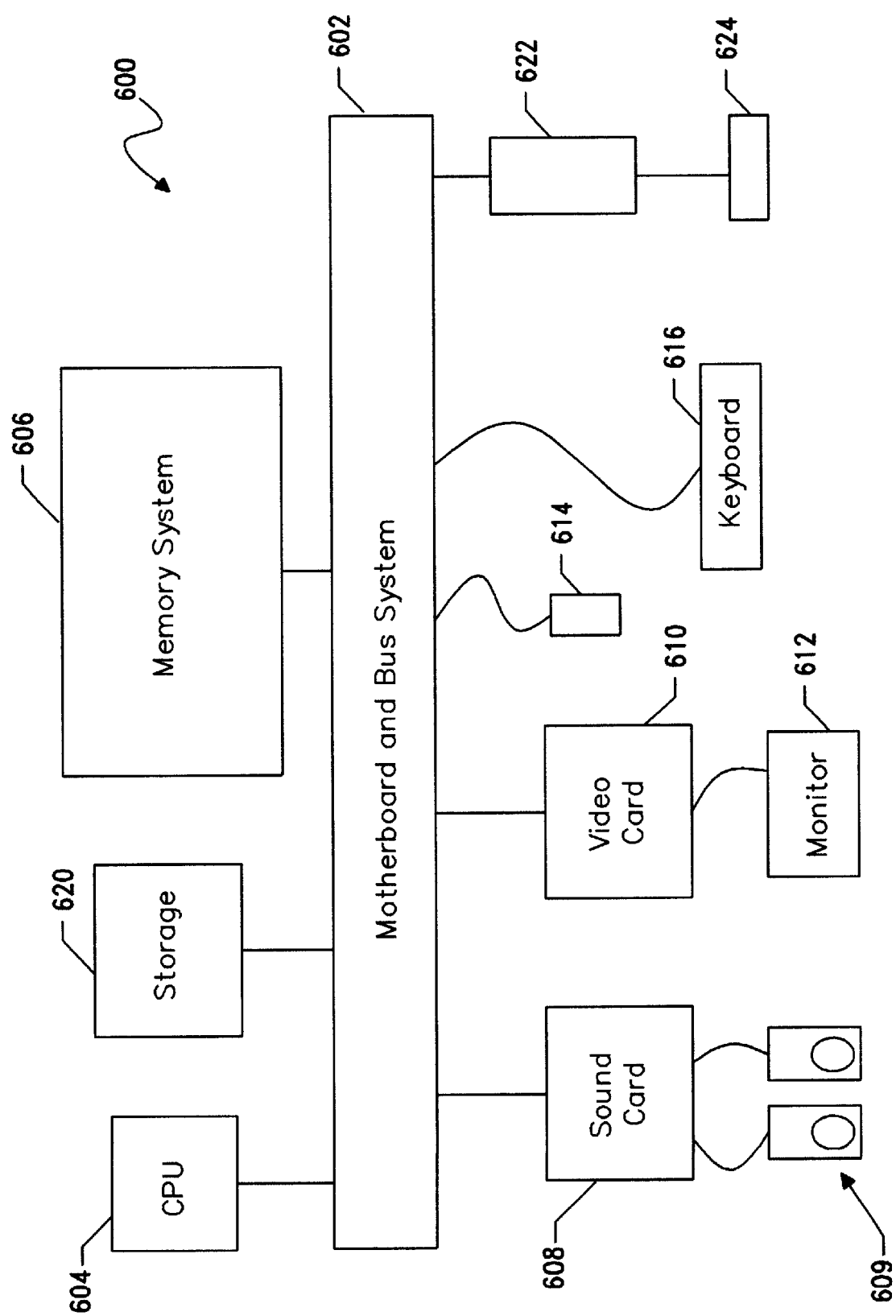
FIG. 6 is a block diagram of an exemplary computer system for practicing preferred embodiments of the present invention.

FIG. 6 is a block diagram of an exemplary computer system 600 for practicing preferred embodiments of the present invention. The computer system 600 is preferably an IBM-compatible, personal computer (PC) system or the like, and includes a motherboard and bus system 602 coupled to at least one central processing unit (CPU) 604 and a memory system 606. The motherboard and bus system 602 include any kind of bus system configuration, such as any combination of a host bus, one or more peripheral component interconnect (PCI) buses, an industry standard architecture (ISA) bus, an extended ISA (EISA) bus, microchannel architecture (MCA) bus, etc., along with corresponding bus driver circuitry and bridge interfaces, etc., as known to those skilled in the art. The CPU 604 preferably incorporates any one of several microprocessors, such as the 80486, Pentium™, Pentium II™, etc. microprocessors from Intel Corp., or other similar type microprocessors such as the K6 microprocessor by Advanced Micro Devices, and supporting external circuitry typically used in PCs. The external circuitry preferably includes an external or level two (L2) cache or the like (not shown). The memory system 606 may include a memory controller or the like and be implemented with one or more memory boards (not shown) plugged into compatible memory slots on the motherboard, although any memory configuration is contemplated.

The computer system 600 includes one or more output devices, such as speakers 609 coupled to the motherboard and bus system 602 via an appropriate sound card 608 and a monitor or display 612 coupled to the motherboard and bus system 602 via an appropriate video card 610. One or more input devices may also be provided such as a mouse 614 and a keyboard 616, each coupled to the motherboard and bus system 602 via appropriate controllers (not shown) as known to those skilled in the art. A storage system 620 is coupled to the motherboard and bus system 602 and may include any one or more data storage devices, such as one or more disk drives including floppy and hard disk drives, one or more CD-ROMs, one or more tape drives, etc. Other input and output devices may also be included, as well as other types of input devices including a microphone, joystick, pointing device, voice recognition, etc. The input and output devices enable a user to interact with the computer system 600 for purposes of data acquisition and perusal, as further described below.

The motherboard and bus system 602 may be implemented with at least one expansion slot 622, which is configured to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 600 may include one or more of several different types of buses and slots, such as PCI, ISA, EISA, MCA, etc. Each slot 622 is configured to receive an expansion card 624, such as a sound card, a modem card, a network interface controller (NIC) or adapter, etc.

Other components, devices and circuitry are normally included in the computer system 600 but are not particularly relevant to the present invention and are not shown. Such other components, devices and circuitry are coupled to the motherboard and bus system 602, such as, for example, an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc. Although the present invention is illustrated with an IBM-compatible type PC system, it is understood that the present invention is applicable to other types of computer systems and processors as known to those skilled in the art.

The above-listed sections and included information are not exhaustive and are only exemplary for computer systems. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

APPENDIX A

```
#include "MessageClient.h"
#include "SignalClient.h"
CMessageClient xMsg;
CSignalClient xSig;
BOOL    xInit(...)
{
        ...
        xMsg.Register("Modem/V34/Rx/P11");       // Openes a new key under V34/Rx
        xSig.Open("c:\\V34\\rx\\p11.sig","V34")  //Openes new stream under the group V34
        ...
}
BOOL    xClose(...)
{
        ...
        xMsg.Unregister();                       // Close the key P11
        xSig.Close();                            // Close the stream
        ...
}
VOID    xRun(...)
{
        ...
        xMsg.Format("%s: %d samples energy is %f", "PLL", nSamples, Eng);  // Print a message
        xSig.Write(InputBuffer, nSamples);
        // Dump a signal
        ...
}
```

What is claimed is:

1. A method for building an online database for a computer system having a server module configured to receive information from kernel modules, the method comprising:
 configuring at least one kernel module to communicate with the server module when the at least one kernel module is operating on the computer system;
 establishing at least one communication channel between the at least one kernel module and the server module such that information may be passed from the at least one kernel module to the server module;
 passing information through the at least one communication channel from the at least one kernel module to the server module;
 compiling, with the server module, the information passed to the server module in a manner selected by a user of the computer system; and
 displaying the information in the manner selected by the user of the computer system to thereby assist in diagnostics of the computer system.

2. The method of claim 1 wherein passing information from the at least one kernel module comprises passing information from at least one passive level module to the server module.

3. The method of claim 2 wherein passing information from the at least one passive level module comprises passing information regarding messages, events, and signals.

4. The method of claim 1 wherein passing information from the at least one kernel level module comprises passing information regarding messages, events, and signals.

5. The method of claim 1 wherein passing information from the at least one kernel level module comprises passing information from a kernel of a modem system.

6. The method of claim 1 wherein displaying the information comprises displaying a hierarchical structure of the information received by the server module from the at least one kernel module such that a user can select a particular portion of the information to view in detail.

7. The method of claim 1 wherein displaying the information to assist in performing diagnostics comprises modifying, based on the displayed information, a configuration of a modem system to optimize communications between the computer system and another computer system.

8. An information server for kernel and passive mode systems comprising:
 at least one server driver that acquires information directly from a kernel of a kernel mode computer program while the kernel mode computer program operates; and
 a server application that is passed information from the at least one server driver in a manner that allows a user to view and organize the information with the server application, the server application also being configured to receive information directly from at least one passive mode program, also in a manner that the user can view and organize the information from the at least one passive mode program.

9. The information server of claim 8 wherein the information passed to the server application from the at least one server driver enables the server application to build a messages and events database.

10. The information server of claim 8 wherein the information passed to the server application from the at least one passive mode program enables the server application to display signals generated by the at least one passive mode program.

11. The information server of claim 8 wherein the server application further comprises:
 at least one communication channel that enables the server application to receive information from the at least one server driver;
 an indicator that indicates to the at least one server driver that the server application is configured to receive information from the at least one server driver through the at least one communication channel.

12. The information server of claim 8 wherein the server application further comprises:
 at least one communication channel that enables the server application to receive information from the at least one passive mode program;
 an indicator that indicates to the at least one passive mode program that the server application is configured to receive information from the at least one passive mode program through the at least one communication channel.

13. The information server of claim 8 wherein the at least one server driver further comprises a module that enables the server driver to operate transparently to the information server if a communication channel is not established between the at least one server driver and the server application.

14. The information server of claim 8 wherein the at least one passive mode program further comprises a module that enables the at least one passive mode program to operate as though no server application exists if a communication channel is not established between the server application and the at least one passive mode program.

15. The information server of claim 8 wherein a computer system operating with the information server operates as though no information server exists on the computer system when the server application is not in operation on the computer system.

* * * * *